(12) United States Patent
Clarkson et al.

(10) Patent No.: US 6,170,470 B1
(45) Date of Patent: Jan. 9, 2001

(54) FUEL SUPPLY SYSTEM FOR AN INTERNAL COMBUSTION ENGINE

(75) Inventors: Daniel E. Clarkson; Chad W. Martin, both of Stillwater, OK (US)

(73) Assignee: Brunswick Corporation, Lake Forest, IL (US)

(*) Notice: Under 35 U.S.C. 154(b), the term of this patent shall be extended for 0 days.

(21) Appl. No.: 09/350,462

(22) Filed: Jul. 9, 1999

(51) Int. Cl.[7] ............................ F02M 37/04; F02B 47/00
(52) U.S. Cl. ........................ 123/497; 123/25 C; 210/187
(58) Field of Search ........................ 123/497, 541, 123/557, 25 R, 25 C; 210/167, 114, 143, 416.4, 187

(56) References Cited

U.S. PATENT DOCUMENTS

| | | | |
|---|---|---|---|
| 3,568,835 | * 3/1971 | Hansen | 210/86 |
| 4,027,993 | * 6/1977 | Wolff | 415/1 |
| 4,296,723 | 10/1981 | Aldrich | 123/510 |
| 4,328,825 | 5/1982 | Bishai | 137/172 |
| 4,340,023 | 7/1982 | Creager | 123/510 |
| 4,389,889 | 6/1983 | Larson | 73/304 |
| 4,519,349 | 5/1985 | Cheney | 123/198 |
| 4,628,871 | 12/1986 | Glass | 123/25 |
| 4,809,934 | 3/1989 | Rix | 244/135 |
| 4,933,077 | * 6/1990 | Wolf | 210/187 |
| 5,053,120 | * 10/1991 | Mollman | 210/86 |
| 5,078,901 | 1/1992 | Sparrow | 210/744 |
| 5,495,839 | * 3/1996 | Samejima et al. | 123/478 |

* cited by examiner

Primary Examiner—Noah P. Kamen
Assistant Examiner—Mahmoud M Gimie
(74) Attorney, Agent, or Firm—William D. Lanyi

(57) ABSTRACT

A fuel system provides first and second conduits that draw fuel from first and second positions, or locations, within a fuel reservoir. If water exists in the fuel reservoir, the second position is selected to be lowered in the fuel reservoir than the first position so that accumulated water will be drawn through the second conduit under certain conditions, such as when the engine is operating at a speed above the minimum threshold. The fuel reservoir can be a fuel tank or auxiliary fuel tank of a vehicle or watercraft or, alternatively, it can be the housing of a fuel/water separator.

20 Claims, 3 Drawing Sheets

FUEL SUPPLY SYSTEM FOR AN INTERNAL COMBUSTION ENGINE

BACKGROUND OF THE INVENTION

1. Field of the Invention

The present invention is generally related to a fuel supply system for an internal combustion engine and, more particularly, to a fuel supply system that is able selectively to draw water away from a fuel reservoir and dispose of the water without adversely affecting the operation of the internal combustion engine.

2. Description of the Prior Art

It is well known that certain fuel reservoirs can collect water within a fuel supply as a result of several causes. Many different concepts have been developed to deal with the problem of water in a fuel reservoir.

U.S. Pat. No. 4,328,825, which issued to Bishai on May 11, 1982, describes a fuel tank water drain system. In a vehicle driven by a diesel engine, a sensor is activated by an accumulation of water in the fuel tank and another sensor is activated when the engine temperature is at a level, less than normal operating level, indicating that the vehicle and its fuel tank have been stationary for a period sufficient to permit separation of the fuel from the water in the tank. A solenoid is energized upon activation of both sensors and opens a drain valve to permit the water to be drained from the tank.

U.S. Pat. No. 4,519,349, which issued to Cheney on May 28, 1985, describes a water ejector fuel system. Apparatus for ejecting water from a fuel system having a fuel reservoir with a water trap which is open to a pump in the presence of water and closed in the absence of water is provided. The pump operates each time the engine is started to receive a charge of water and each time the engine is stopped to discharge the charge of water to the exterior of the reservoir.

U.S. Pat. No. 4,389,889, which issued to Larson on Jun. 28, 1983, describes an apparatus for detecting the presence of water in a fuel tank. The fuel level in the tank is determined by detecting the change in capacitance between a pair of electrodes positioned with a generally vertical orientation so that as the fuel rises in the tank, an increasing area of the plates is adjacent to the fuel. Since the presence of water in fuel is very undesirable, the apparatus also includes means for detecting this water before it can affect engine performance and before it can affect the accuracy of the fuel level indicating circuitry.

U.S. Pat. No. 4,296,723, which issued to Aldrich on Oct. 27, 1981, describes an engine fuel system with fuel/water separation. The system includes a fuel storage tank connected to a vacuum pump by a supply line, a fuel/water separator, a fuel lift pump, a fuel/water return line and a fuel injector pump or carburetor. The fuel/water separator includes a coalescer interposed between the fuel lift pump and the injector pump or carburetor to separate the water from the fuel. Water collects in the lowest portion of the separator housing, is removed through an orifice in the fuel/water return line, and is routed back to the fuel tank. With moderate levels of water contamination in the fuel tank the system prevents water from reaching the fuel injector pump or carburetor for an indefinite period of time. The separator housing is constantly drained wince the separator is under pressure. The system has a suitable detector to detect the water level in the fuel storage tank. Water may be removed from the fuel storage tank by temporarily converting a part of the water/fuel return line to a water outlet pumping line through a three-way valve.

U.S. Pat. No. 5,078,901, which issued to Sparrow on Jan. 7, 1992, describes an automatic fuel decontamination system and method. The invention provides a system for the automatic removal of contaminants such as water from the fuel supply of an internal combustion engine of the type including an auxiliary fuel tank. The system is automatically controlled and responsive to sensed contaminant levels in a contaminant removal mechanism and employs an existing fuel transfer pump to direct fuel around the auxiliary fuel tank through the contaminant removal mechanism. The pump additionally operates to provide a continuous supply of fuel to the engine to keep it operating while simultaneously permitting the discharge of contaminants from the contaminants removal mechanism when a predetermined maximum contaminant level has been reached. This system is especially effective in removing water from the fuel system of a diesel engine powered vehicle such as a tank wherein the engine and auxiliary fuel tank are components of a power pack that is removable from the tank.

U.S. Pat. No. 4,861,469, which issued to Rossi et al on Aug. 29, 1989, discloses a fuel tank dewatering apparatus. The dewatering apparatus is for insertion into and retrieval from an engine fuel tank through the tank inlet for removing water from the liquid fuel contained in the tank. The apparatus includes an elongate cylindrical container of fixed capacity and an elongate tie connected thereto and accessibly anchored near the fuel tank inlet. A volume of dry particulate hygroscopic material, principally cross-linked polyacrylamide co-polymer fills a minor portion of the container capacity and is expandable to many times its dry volume in the presence of water without absorbing the liquid fuel, so as to remove water therefrom within the capacity of the container. The dry volume is selected to limit the fully expanded volume to within the capacity of the container. The container is made of nylon or Delrin plastic and includes a rigid structural cage having spaced longitudinal and circumferential ribs, joined together with end closures and with a cylindrical screen contained within the cage for providing substantial porous wall surfaces exposed therebetween which are permeable to air, water and the liquid fuel but substantially impermeable to the hygroscopic material.

U.S. Pat. No. 4,809,934, which issued to Rix on Mar. 7, 1989, discloses an on-board disposal of water in aircraft fuel tanks. The system is adapted for the automatic extraction and dispersion of entrapped puddle of water in an aircraft fuel tank as a function of fuel flow supply to at least one propulsion engine. Scavenge pipes, positioned to be immersed in the puddles at their inlet openings, are connected to a venturi located within a fuel supply duct and arranged such that fuel drawn through the duct by means of a jet pump induces water extraction by suction at the venturi throat which is subsequently broken up within the jet pump and dispersed in the fuel.

U.S. Pat. No. 4,628,871, which issued to Glass on Dec. 16, 1986, discloses a fuel supply system for an internal combustion engine. The system has an intake manifold, an exhaust manifold, a carburetor and an air cleaner mounted on the carburetor. The system includes a heat exchanger in the exhaust manifold and a converter within the heat exchanger. An adapter plate is mounted on the intake manifold and the carburetor is mounted on the adapter plate. The adapter plate has passages providing communication between the carburetor and the intake manifold and with a metering valve mounted on the adapter plate. A main liquid fuel inlet line having a pressure regulator, a solenoid valve, a vacuum responsive pressure regulator and a vacuum controlled needle valve is connected to a fuel pump. The fuel inlet line is split into a primary fuel line and the secondary fuel line which are connected to the converter. The solenoid valve and a check valve are located in the secondary line and a check valve is located in the primary line. A water supply line having a pressure regulator, a solenoid valve, a fixed orifice restrictor and a check valve is connected to the converter. A vacuum controlled switch is connected to the converter. A vacuum controlled switch is connected to the intake manifold and is electrically connected to the solenoid valve in the secondary fuel line and the water supply line to open the solenoid valves when the vacuum in the intake manifold increases as the engine accelerates. A fuel vapor line connects the converter and the metering valve to supply fuel vapor and steam to the metering valve to mix with the air flowing through the carburetor to provide a hot fuel vapor, steam and air mixture to the intake manifold. The vacuum controlled switch is connected to the vacuum responsive pressure regulator and the vacuum controlled needle valve to provide increased fuel flow through the main fuel inlet line as the engine accelerates and the vacuum in the intake manifold increases.

U.S. Pat. No. 4,340,023, which issued to Creager on Jul. 20, 1982, describes a fuel supply and return system with a bypass valve and a water pumpout. The system is particularly useful with diesel fuel. The fuel is picked up through a fuel strainer system and pumped through a supply line to the engine. Excess fuel is returned to the fuel tank through a fuel return line. Since any water in the fuel separates from the diesel fuel and settles in the bottom of the tank, the water must at times be removed. By extending the fuel return tube to the bottom of the tank a siphon tube is provided which can be connected to a pump to pump out the water. If the water in the bottom of the tank freezes, a bypass valve in the upper portion of the fuel return line, but within the tank, operates so that returned fuel may still be discharged in the tank. Two flexible bypass valve arrangements are shown, both using variations of a duckbill valve to provide a closed valve when siphoning or pumping of the water takes place.

It would be significantly beneficial if an automatic means could be provided which removes water from a fuel/water separator without the need for intervention by an operator of the internal combustion engine.

SUMMARY OF THE INVENTION

A fuel supply system for an internal combustion engine made in accordance with the present invention comprises a fuel pump, a fuel reservoir, and a first conduit connected in fluid communication with the fuel reservoir at a first location which is a first distance above the bottom of the fuel reservoir. The first conduit is connected to the fuel pump for pumping fuel from the fuel reservoir toward a combustion chamber of an engine.

A second conduit is connected in fluid communication with the fuel reservoir at a second location which is a second distance above the bottom of the fuel reservoir. The first distance is greater than the second distance. A valve is connected to the second conduit for opening and closing a fuel path from the fuel reservoir through the second conduit. The engine is provided with an engine speed measuring device, a manifold pressure sensor, and a micro-processor is connected in signal communication with the engine speed and manifold pressure measuring devices and with the valve in order to allow the micro-processor to open the fuel path through the second conduit in response to a predetermined parameters, such as the speed of the internal combustion engine which exceeds a first predetermined threshold magnitude and the manifold pressure which is indicative of the load on the engine, and to close the fuel path through the second conduit in response to either a speed of the internal combustion engine which exceeds a second predetermined threshold magnitude or a load which is less than a predetermined threshold magnitude, or a combination of both. The first and second predetermined threshold magnitudes can be of identical magnitudes or, in certain embodiments of the present invention, can be different from each other to allow for a certain degree of hysteresis in the operation of the system.

The fuel reservoir can be a fuel supply tank or, alternatively, it can be a housing of a fuel and water separator. The second conduit can be connected between the valve and an intake manifold of the internal combustion engine to allow collected water to be conducted to the intake manifold for disposal through the engine's combustion chambers. The second conduit can alternatively be connected between the valve and the fuel pump to allow the water to be pumped with the fuel to the engine.

The first and second conduits can be connected to the valve and the valve can be connected in fluid communication between the fuel pump and the first and second conduits. The present invention, in a particularly preferred embodiment, can further comprise a water sensor disposed within the fuel reservoir and connected in signal communication with the micro-processor. The microprocessor can then be responsive to a signal from the water sensor and a signal from the engine speed measuring device to open the fuel path when the speed of the internal combustion engine exceeds the first predetermined threshold magnitude and a water sensor detects the presence of water within the fuel reservoir.

In certain embodiments of the present invention, the first conduit is disposed in thermal communication with a cooling fluid and the system further comprises a fuel/water separator that is disposed in fluid communication between the fuel pump and the fuel reservoir. In certain embodiments of the present invention, it can further comprise a float attached to a distal end of the first conduit to maintain the distal end near a surface of the fuel within the fuel reservoir.

BRIEF DESCRIPTION OF THE DRAWINGS

The present invention will be more fully and completed understood from a reading of the description of the preferred embodiment in conjunction with the drawings, in which.

DESCRIPTION OF THE PREFERRED EMBODIMENT

Figure 1:
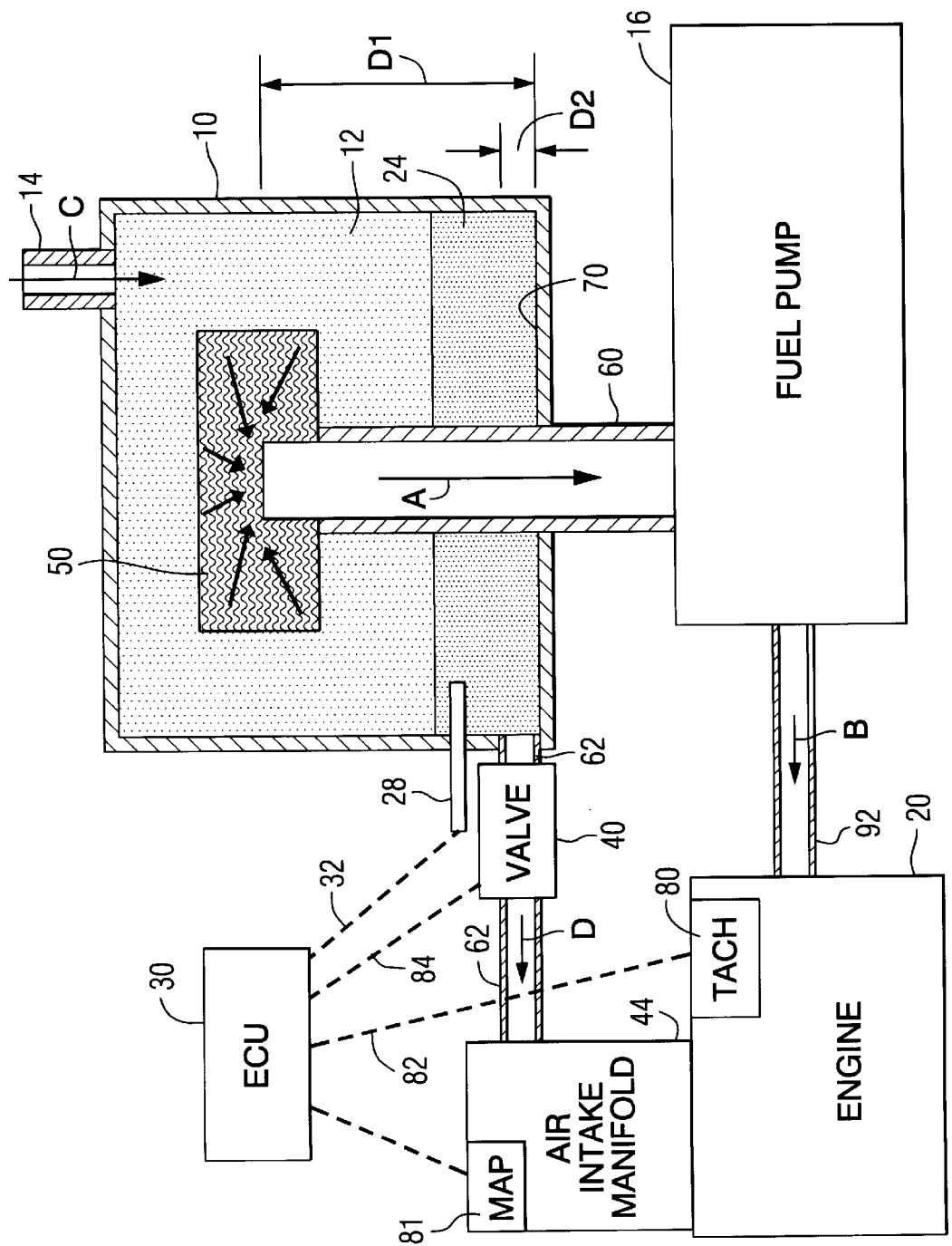
FIG. 1 is a schematic illustration of an embodiment of the present invention related to a fuel/water separator.

Throughout the description of the preferred embodiment, like components will be identified by like reference numerals.

FIG. 1 shows a fuel reservoir 10 which contains the quantity of fuel 12 therein. A fuel pump 16 pumps fuel, in the direction represented by arrow A, from the fuel reservoir 10 and to an engine 20 in a direction represented by arrow B. The fuel reservoir 10 receives fuel, in the direction represented by arrow C from an external source such as a main fuel tank.

Within the fuel reservoir 10 in FIG. 1, a quantity of water 24 has collected in the bottom portion of the fuel reservoir 10. The presence of the water 24 can be sensed by a water sensor 28 that is connected in signal communication with an engine control unit 30, as indicated by dashed line 32. When water 24 is detected within the reservoir 10, the engine control unit 30 can open electrically controlled valve 40 to allow the water 24 to flow, as represented by arrow D, to the engine 20. More specifically, one embodiment of the present invention causes the water 24 to flow into the air intake manifold 44 of the engine and be drawn into the combustion chambers of the engine 20. The engine control unit 30 typically monitors the engine speed of the engine 20 for use in controlling the operation of the engine. This engine speed, typically measured in revolutions per minute (RPM), can be used to determine when the engine 20 is operating at a sufficiently high speed to be unaffected by the passage of water from the reservoir 10 into the engine 20 through the air intake manifold 44. Typically, when the engine 20 is operating at speeds greater than 3,000 RPM, the presence of some water in the fuel/air mixture of the engine 20 will not have a noticeable affect on the operation of the engine. As will be described in greater detail below, the load on the engine 20 can also be considered by the microprocessor during this computation. For example, situations where the engine speed is moderately low, but the load on the engine is very low, may warrant the disposal of the water 24 through the engine. Other conditions, however, where the engine speed is moderately high, but the load on the engine is very high, may not be appropriate for these purposes. Each combination of a boat and motor may require different considerations with regard to engine speed and load on the engine. These can be determined empirically and stored in the microprocessor in the form of look-up tables or a mathematical relationship.

The arrangement of the present invention shown in FIG. 1 is used in conjunction with a fuel/water separator 50 that permits the fuel 12 to flow through a first conduit 60, but does not permit water 24 to flow through the fuel/water separator 50. This allows the fuel 12 to pass through the first conduit 60 and be pumped by the fuel pump 16 to the engine 20. Since the fuel/water separator 50 does not allow water to pass through it, the water is forced to accumulate in the reservoir 10 at its bottom portion as indicated by reference numeral 24. When a sufficient quantity of water 24 has accumulated in the fuel reservoir 10 and when the engine 20 is operating at a sufficiently high engine speed to accommodate the passage of water through the second conduit 62, the electrically operated valve 40 is opened to allow the water 24 to flow as represented by arrow D in FIG. 1.

As can be seen in FIG. 1, the first conduit 60 is connected in fluid communication with the fuel reservoir 10 at a first location which is a first distance D1 from the bottom 70 of the fuel reservoir 10. In this application which is illustrated in FIG. 1, the relevant portion of the first conduit 60 is its distal end which is at the first location which is at a first distance D1 from the bottom 70 of the fuel reservoir 10. The second conduit 62 is connected in fluid communication with the fuel reservoir 10 at a second location which is a second distance D2 from the bottom 70 of the reservoir 10. In other words, the point of fluid communication of the first and second conduits, 60 and 62, are located so that the point at which the fuel flows into the distal end of the first conduit 60 is above the point at which the fuel or water flows into the distal end of the second conduit 62.

In the embodiment of the present invention shown in FIG. 1, the engine speed measuring device is illustrated as being a tachometer 80 which is connected in signal communication with the engine control unit 30, as represented by dashed line 82. The engine control unit 30 receives information from the engine speed measuring device, or tachometer 80, and from the water sensor 28 on dashed line 32. In a particularly preferred embodiment, the present invention also comprises a manifold air pressure (MAP) sensor 81 which provides a pressure reading of the manifold air pressure which is indicative of the load on the engine 20. It is particularly useful for the engine control unit 30 to consider both the engine speed and load on the engine when deciding whether or not the accumulated water from the fuel/water separator 50 reservoir 10 can be tolerated by the engine under the current conditions. For example, if the engine is operating at a low speed, it is not advisable to allow the water 24 to pass through the valve 40 and conduit 62 to the engine 20. Similarly, even if the engine 20 is operating at reasonably high speeds, it may not be advisable to conduct the water 24 to the engine 20 is operating under high loads. The engine control unit 30 can compare these two parameters, speed and load, to predetermined thresholds and determine the appropriate times to operate valve 40 to remove the water 24 from the reservoir and pass it through the engine 20. The micro-processor of the engine control unit 30 then determines whether or not conditions are appropriate for opening valve 40 by providing a signal to the valve 40, as represented by dashed line 84. Although a tachometer 80 is illustrated as being the engine speed measuring device in FIG. 1, it should be understood that many other devices are available and well known to those skilled in the art for the purpose of measuring the operating speed of an engine 20. Gear tooth sensors and various types of resolvers are available for these purposes.

Figure 2:
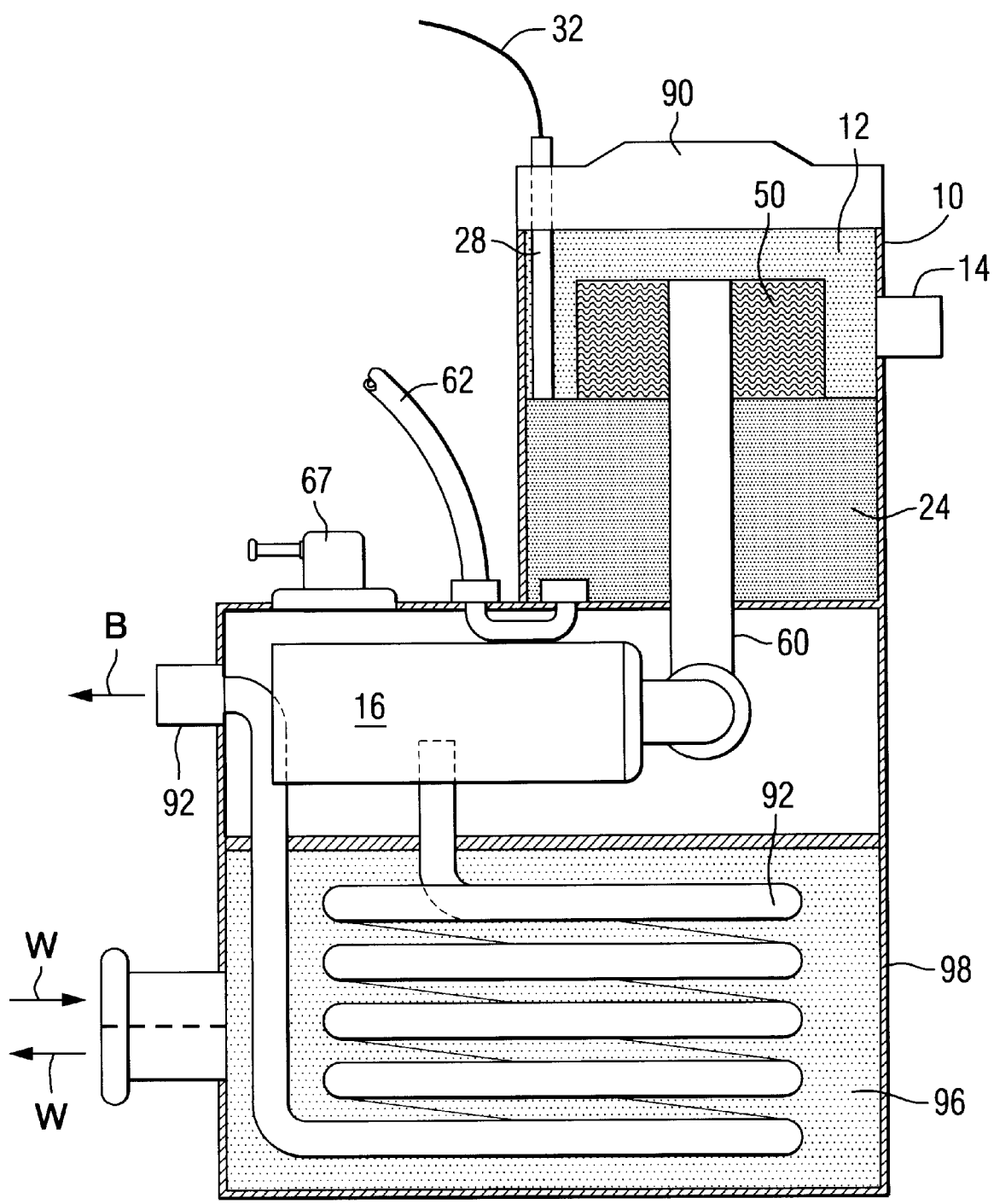
FIG. 2 is an embodiment of the present invention incorporating a fuel/water separator and a cooling circuit.

In the embodiment of FIG. 1, the fuel reservoir 10 is a housing for a fuel/water separator 50. FIG. 2 shows an alternative embodiment of the present invention which also comprises a fuel reservoir 10 that is a housing for a fuel/water separator 50. The fuel reservoir 10 is provided with a cover 90 through which the water sensor 28 extends. A fuel pump 16 pumps fuel from the fuel reservoir 10 to an engine (not shown in FIG. 2) through a fuel supply conduit 92. In the embodiment of FIG. 2, the fuel supply conduit 92 is routed through a cooling solution 96 which is contained within a water manifold 98. After the fuel passes through the fuel conduit 92 and is cooled by its thermal communication with the cooling fluid 96, it is conducted to the engine as represented by arrow B. Cooling water can flow into and out of the water manifold, or reservoir 98, as represented by arrows W. It should be understood that the precise manner in providing cooling water into the water manifold 98 and removing water from the manifold 98 is not limiting to the present invention. Many different arrangements are possible for these purposes.

With continued reference to FIG. 2, the water 24 is removed from the fuel reservoir 10 through the second conduit 62 in the manner described above. The valve 40, shown in FIG. 1, is under the control of a micro-processor, such as an engine control unit 30, in response to measurements taken by the engine control unit such as the engine speed, the load on the engine, and the presence or absence of water 24 as sensed by the water sensor 28. The water or fuel passed through the second conduit 62 can be directed into the air intake manifold of the engine or combined with the fuel pumped by the fuel pump 16. In the embodiment shown in FIG. 2, it is preferable to conduct the water 24 from the bottom portion of the fuel reservoir 10 directly to the air intake manifold so that it can be combined with the air/fuel mixture flowing toward and into the combustion chambers of the engine. The top portion of a fuel pressure regulator 67 is also shown in FIG. 2.

Figure 3:
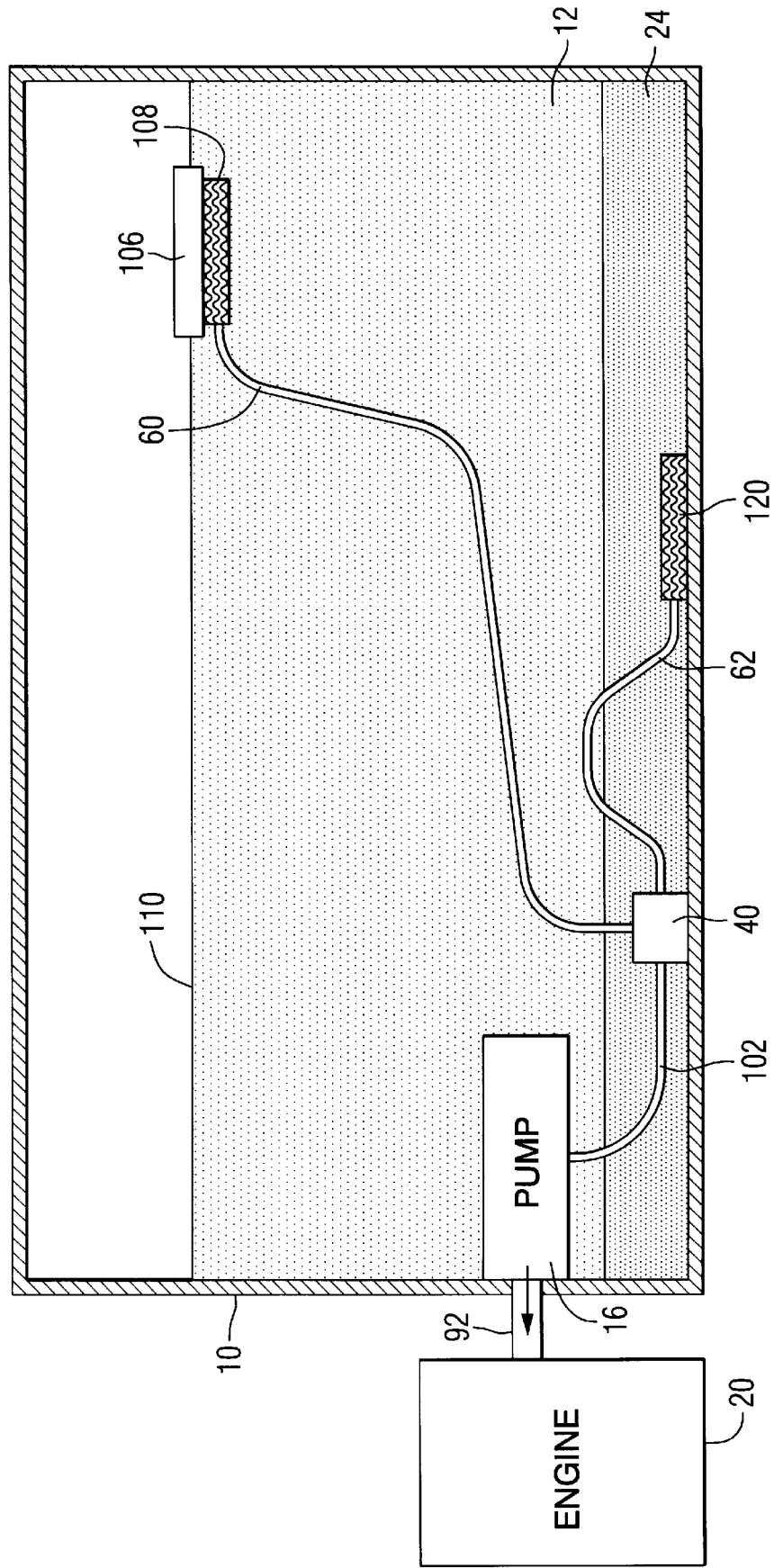
FIG. 3 is an embodiment of the present invention relating to a fuel tank.

FIGS. 1 and 2 show two embodiments of the present invention in which the fuel reservoir 10 is used in conjunction with a fuel/water separator 50. However, it should be understood that other embodiments are within the scope of the present invention. For example, FIG. 3 shows a fuel reservoir 10 that is a main fuel tank or an auxiliary fuel tank of a vehicle or watercraft driven by an engine 20. A fuel pump 16 is connected to a valve 40 by an appropriate conduit 102. The valve 40 is connected to a first conduit 60 and to a second conduit 62. The first conduit 60 has a distal end that is attached to a float 106 that maintains a filter member 108 at a position near the surface 110 of the fuel 12. As fuel is added to the fuel reservoir 10 or removed from the fuel reservoir 10, the float member 106 maintains the position of the distal end of the first conduit 60 near the upper surface 110. This assures that the first conduit 60 will not draw water through it and through the valve 40 to the pump 16. The second conduit 62 has a distal end that is connected to a filter member 120 which is not supported by a float or buoyant member. The distal end of the second conduit 62 is disposed at or near the bottom of the fuel reservoir 10 and, when water 24 is present within the fuel reservoir 10, it will be conducted through the second conduit 62 when the valve 40 is in the appropriate position. For purposes of simplicity and clarity, FIG. 3 does not show the engine control unit 30, the tachometer 80 or the signal lines, 32, 82, and 84, that connect the engine control unit 30 to the valve 40 and engine speed measuring device, such as the tachometer 80. However, the embodiment shown in FIG. 3 is within the scope of the present invention because it comprises the fuel pump 16 and the fuel reservoir 10, the first conduit 60 that has a distal end in fluid communication with the fuel reservoir at a first location which is at a first distance above the bottom of the fuel reservoir. The embodiment shown in FIG. 3 also comprises a second conduit 62 that is connected in fluid communication with the fuel reservoir through its distal end, at a second location which is a second distance above the bottom of the fuel reservoir. The first distance is greater than the second distance. The valve 40 is connected to the second conduit 62 for opening and closing a fuel path from the fuel reservoir 10 through the second conduit 62. The embodiment in FIG. 3 also connects the valve 40 in fluid communication with the first conduit 60. The engine 20 has an engine speed measuring device, not shown in FIG. 3, and a micro-processor that is connected in signal communication with the engine speed measuring device. Although the engine control unit 30 and engine speed measuring device 80 are not shown in FIG. 3, one skilled in the art can easily understand how the interconnections between these components would be virtually identical to those described above in conjunction with FIG. 1.

In operation, the engine control unit would monitor the speed of the engine 20 and control the valve 40 to allow water 24 to flow through the second conduit 62 and the conduit 102 between the pump 16 and valve 40 when the engine is operating at a sufficiently high speed. Although no water sensor 28 is shown in FIG. 3, it can be appreciated that fuel can be drawn through the second conduit 62 at any time when the engine 20 is operating above a minimum threshold, whether the water 24 exists at the bottom of the fuel reservoir 10 or not. In other words, as long as the engine 20 is operating above a minimum threshold speed, the valve 40 can be set to draw fuel through the second conduit 62 because water flowing into the engine 20 when the engine is operating at relatively high speeds will not have a significantly adverse affect on the operational characteristics of the engine. If no water 24 exists in the fuel reservoir 10, normal liquid fuel will be drawn through the second conduit 62 and the engine 20 will operate normally under either of these two alternative conditions. When the engine 20 is operating at speeds below the minimum threshold, fuel will be drawn through the first conduit 60 by setting the valve 40 at the appropriate position to inhibit flow through the second conduit 62 and force all fuel flow to be conducted along the path comprising the first conduit 60 and the fuel conduit 102.

Although the present invention has been described with particular specificity and illustrated to show preferred embodiments of the present invention, alternative embodiments are also within its scope.

I claim:

1. A fuel supply system for an internal combustion engine, comprising:

a fuel pump;

a fuel reservoir, said fuel reservoir being a housing in which water separates from fuel and is collected at a bottom portion of said fuel reservoir;

a first conduit connected in fluid communication with said fuel reservoir at a first location which is a first distance above said bottom portion of said fuel reservoir, said first conduit being connected in fluid communication with said fuel pump for pumping fuel from said fuel reservoir toward a combustion chamber of said engine;

a second conduit connected in fluid communication with said fuel reservoir at a second location which is a second distance above said bottom portion of said fuel reservoir, said first distance being greater than said second distance, said second conduit being connected in fluid communication with said fuel pump for pumping fuel from said bottom portion of said fuel reservoir toward said combustion chamber of said engine;

a valve connected to said second conduit for opening and closing a fuel path from said fuel reservoir through said second conduit toward said combustion chamber of said engine;

an engine speed measuring device; and a microprocessor connected in signal communication with said engine speed measuring device and with said valve to open said fuel path through said second conduit in response to a speed of said internal combustion engine which exceeds a first predetermined threshold magnitude and to close said fuel path through said second conduit in response to a speed of said internal combustion engine which exceeds a second predetermined threshold magnitude, whereby water collected at said bottom portion of said fuel reservoir will flow from said fuel reservoir through said second conduit.

2. The fuel supply system of claim 1, wherein:

said fuel reservoir is a fuel supply tank.

3. The fuel supply system of claim 1, wherein:

said fuel reservoir is a housing of a fuel and water separator.

4. The fuel supply system of claim 1, wherein:

said second conduit is connected between said valve and an intake manifold of said internal combustion engine.

5. The fuel supply system of claim 1, wherein:

said second conduit is connected between said valve and said fuel pump.

6. The fuel supply system of claim 1, wherein:
said first and second conduits are connected to said valve and said valve is connected in fluid communication between said fuel pump and said first and second conduits.

7. The fuel supply system of claim 1, further comprising:
a water sensor disposed within said fuel reservoir and connected in signal communication with said microprocessor, said microprocessor being responsive to a signal from said water sensor and a signal from said engine speed measuring device to open said fuel path when said speed of said internal combustion engine exceeds said first predetermined threshold magnitude and water sensor detects the presence of water within said fuel reservoir.

8. The fuel supply system of claim 1, wherein:
said first conduit is disposed in thermal communication with a cooling fluid.

9. The fuel supply system of claim 1, further comprising:
a fuel/water separator disposed in fluid communication between said fuel pump and said fuel reservoir.

10. The fuel supply system of claim 1, further comprising:
a float attached to a distal end of said first conduit to maintain said distal end near a surface of a fuel within said fuel reservoir.

11. The fuel supply system of claim 1, further comprising:
a pressure sensor disposed in pressure sensing relation with an air intake manifold of said engine, said microprocessor being connected in signal communication with said engine speed measuring device, with said pressure sensor, and with said valve to open said fuel path through said second conduit in response to a predetermined combination of magnitudes of engine speed and manifold pressure.

12. A fuel supply system for an internal combustion engine, comprising:
a fuel pump;
a fuel reservoir, said fuel reservoir collecting a quantity of water at a bottom portion of said fuel reservoir;
a first conduit connected in fluid communication with said fuel reservoir at a first location which is a first distance above said bottom portion of said fuel reservoir, said first conduit being connected in fluid communication with said fuel pump for pumping fuel from said fuel reservoir toward a combustion chamber of said engine;
a second conduit connected in fluid communication with said fuel reservoir at a second location which is a second distance above said bottom portion of said fuel reservoir, said first distance being greater than said second distance, said second conduit being connected in fluid communication with said fuel pump for pumping fuel from said bottom portion of said fuel reservoir toward said combustion chamber of said engine;
a valve connected to said second conduit for opening and closing a fuel path from said fuel reservoir through said second conduit toward said combustion chamber of said engine, said second conduit being connected between said valve and an intake manifold of said internal combustion engine;
an engine speed measuring device; and
a microprocessor connected in signal communication with said engine speed measuring device and with said valve to open said fuel path through said second conduit in response to a speed of said internal combustion engine which exceeds a first predetermined threshold magnitude and to close said fuel path through said second conduit in response to a speed of said internal combustion engine which exceeds a second predetermined threshold magnitude, whereby water collected at said bottom portion of said fuel reservoir will flow from said fuel reservoir through said second conduit.

13. The fuel supply system of claim 12, wherein:
said fuel reservoir is a housing of a fuel and water separator.

14. The fuel supply system of claim 13, wherein:
said valve is connected between said second conduit and said fuel pump.

15. The fuel supply system of claim 12, wherein:
said first and second conduits are connected to said valve and said valve is connected in fluid communication between said fuel pump and said first and second conduits.

16. The fuel supply system of claim 12, further comprising:
a water sensor disposed within said fuel reservoir and connected in signal communication with said microprocessor, said microprocessor being responsive to a signal from said water sensor and a signal from said engine speed measuring device to open said fuel path when said speed of said internal combustion engine exceeds said first predetermined threshold magnitude and water sensor detects the presence of water within said fuel reservoir.

17. The fuel supply system of claim 12, wherein:
said first conduit is disposed in thermal communication with a cooling fluid.

18. The fuel supply system of claim 17 further comprising:
a fuel/water separator disposed in fluid communication between said fuel pump and said fuel reservoir.

19. A fuel supply system for an internal combustion engine, comprising:
a fuel pump;
a fuel reservoir, in which water separates from fuel and is collected at a bottom portion of said fuel reservoir;
a first conduit connected in fluid communication with said fuel reservoir at a first location which is a first distance above said bottom portion of said fuel reservoir, said first conduit being connected to said fuel pump for pumping fuel from said fuel reservoir toward a combustion chamber of said engine;
a second conduit connected in fluid communication with said fuel reservoir at a second location which is a second distance above said bottom portion of said fuel reservoir, said first distance being greater than said second distance, said second conduit being connected in fluid communication with said fuel pump for pumping fuel from said bottom portion of said fuel reservoir toward said combustion chamber of said engine;
a valve connected to said second conduit for opening and closing a fuel path from said fuel reservoir through said second conduit toward said combustion chamber of said engine, said first and second conduits being connected to said valve and said valve being connected in fluid communication between said fuel pump and said first and second conduits;
an engine speed measuring device;
a pressure sensor disposed within an air intake manifold of said engine to measure manifold pressure; and a microprocessor connected in signal communication with said engine speed measuring device, said pressure sensor, and with said valve to open said fuel path through said second conduit in response to a preselected combination of engine speed and manifold pressure, whereby water collected at said bottom portion of said fuel reservoir will flow from said fuel reservoir through said second conduit.

20. The fuel supply system of claim 19, further comprising:

a water sensor disposed within said fuel reservoir and connected in signal communication with said microprocessor, said microprocessor being responsive to a signal from said water sensor and a signal from said engine speed measuring device to open said fuel path when said speed of said internal combustion engine exceeds said first predetermine threshold magnitude and water sensor detects the presence of water within said fuel reservoir.

* * * * *